United States Patent [19]
Sumihiro

[11] Patent Number: 5,583,572
[45] Date of Patent: Dec. 10, 1996

[54] MOVING PICTURE DECODING DEVICE

[75] Inventor: Hiroshi Sumihiro, Kanagawa, Japan

[73] Assignee: Sony Corporation, Japan

[21] Appl. No.: 461,182

[22] Filed: Jun. 5, 1995

Related U.S. Application Data

[63] Continuation of Ser. No. 160,691, Dec. 2, 1993, abandoned.

[30] Foreign Application Priority Data

Dec. 4, 1992 [JP] Japan ..................................... 4-325751

[51] Int. Cl.$^6$ ..................................................... H04N 7/32
[52] U.S. Cl. ........................... 348/396; 348/717; 348/409
[58] Field of Search ..................................... 348/717, 716, 348/715, 402, 396, 391, 423, 492, 493, 716

[56] References Cited

U.S. PATENT DOCUMENTS

| | | | |
|---|---|---|---|
| 4,758,881 | 7/1988 | Laspada | 348/717 |
| 4,918,523 | 4/1990 | Simon et al. | 348/396 |
| 5,036,391 | 7/1991 | Auvray et al. | 348/420 |
| 5,122,875 | 6/1992 | Raychaudhuri et al. | 348/390 |
| 5,144,424 | 9/1992 | Savatier | 348/405 |
| 5,159,452 | 10/1992 | Kinoshita et al. | 358/141 |
| 5,237,424 | 8/1993 | Nishino et al. | 348/396 |
| 5,270,811 | 12/1993 | Ishibashi et al. | 358/108 |
| 5,287,178 | 2/1994 | Acampora et al. | 348/384 |
| 5,289,276 | 2/1994 | Siracusa et al. | 348/467 |
| 5,343,248 | 8/1994 | Fujinami | 348/452 |

FOREIGN PATENT DOCUMENTS

| | | | |
|---|---|---|---|
| 0456394A2 | 11/1991 | European Pat. Off. | G09G 1/16 |
| 0503956A2 | 9/1992 | European Pat. Off. | H04N 7/13 |
| 0543197A2 | 5/1993 | European Pat. Off. | G11C 7/00 |
| 0573665 | 12/1993 | European Pat. Off. | H04N 7/137 |

OTHER PUBLICATIONS

Optical Engineering, vol. 28, No. 7, Jul. 1989, Bellingham, WA, US pp. 700–707, XP33796 H. Amor et al. "Technical issue in low rate transform coding" * p. 706, paragraph 10.
ISO/IEC JTC1/SC2/WG11 MPEG 91/217, Nov. 1991 'Matshita proposal description for MPEG II' * pp. 15–21 ** p. 51, paragraph 6–3*.
International Standard of Multi–Media Coding, 30 Jun. 1991 * pp. 126–142 * Hiroshi Yasuda * pp. 133–135.

*Primary Examiner*—Tommy P. Chin
*Assistant Examiner*—A. Au
*Attorney, Agent, or Firm*—Limbach & Limbach L.L.P.

[57] ABSTRACT

A moving picture decoding device in which picture data is read from a picture memory responsive to a motion vector to perform decoding the motion-compensated moving picture and in which the picture data is also read in a pre-set sequence for display. With the present moving picture decoding device, the combination of data, that is a word format, for a word simultaneously read from four memory devices (DRAMs), is set so as to be different for the motion compensation and for display. That is, during motion compensation, simultaneous reading of a word consisting of luminance (Y) signal component data D0, D1, D2 and D3 is time-divisionally changed over to simultaneous reading of a word consisting of chroma ($C_b$ and $C_r$) signal component data D2, D3, D0 and D1. During display, two luminance data D0 and D1 (or D2 and D3) are read out simultaneously with the chroma ($C_b$ and $C_r$) signal component data D2, D3 (or D0 and D1).

8 Claims, 14 Drawing Sheets

FIG.6(A) WORD FORMAT DURING MC

FIG.6(B) WORD FORMAT DURING DISPLAY

MOVING PICTURE DECODING DEVICE

This is a continuation of application Ser. No. 08/160,691 filed on Dec. 2, 1993 now abandoned.

BACKGROUND OF THE INVENTION

This invention relates to a moving picture decoding device in which picture data is read from a picture memory responsive to a motion vector to perform decoding of motion-compensated moving pictures and in which the picture data are also read in a pre-set sequence for display.

There are a variety of systems for compressing and encoding moving picture signals, such as television telephone/television conference signals or telecast signals. Recently, a hybrid encoding system, such as MC-DCT, which consists in a combination of a so-called motion compensated (MC) inter-frame prediction and discrete cosine transform (DCT), is thought to be promising.

FIG. 1 shows a circuit arrangement for illustrating the above-mentioned MC-DCT hybrid system. In this figure, moving picture signals, such as television signals, are supplied as input signals to an input terminal 111. These input signals are supplied to a motion detection circuit 113 and a subtractive node 114 via a picture memory 112 employed as a frame memory. An output of the subtractive node 114 is transmitted to a DCT circuit 115 for discrete cosine transformation and thence supplied to a quantizer 116 for quantization before being supplied to a series circuit as a local decoder, consisting of a inverse quantization unit 117 and an inverse DCT (IDCT) circuit 118. An output of the IDCT circuit 118 is supplied via an additive node 119 to a picture memory 120 employed as a field memory. An output read from the picture memory 120 is transmitted to the motion detection circuit 113 and to a motion compensation circuit 121. The motion detection information such as the motion vector from the motion detection circuit 113 is transmitted to the motion compensation circuit 121. An output of the motion compensation circuit 121 is supplied to the subtractive node 114 and to the additive node 119.

It is noted that the input signals are stored temporarily in the picture memory 112 and subsequently read and processed on the basis of a block of a pre-set size. The motion detection circuit 113 compares the values of pixels of a signal block from the picture memory 112 to the values of pixels of locally decoded signals from the picture memory 120 for detecting the motion vector. The motion compensation circuit 121 outputs a reference block to the subtractive node 114 based on this motion vector. The subtractive node 114 outputs a difference between the input picture signal block and the reference block. The difference output is discrete cosine transformed by the DCT circuit 115 and quantized by the quantizer 116 before being supplied to a variable length coding unit 123, such as an entropy coding unit, for variable length coding. The motion vector from the motion detection circuit 113 is also supplied to the variable length coding unit 123 for variable length coding.

An output of the variable length coding unit 123 is supplied to a transmitting buffer memory 125 where the coded data to be transmitted is stored transiently. The quantization by the quantizer 116 and the coding by the variable length coding unit 123 are controlled so that the amount of transmitted data per unit time will be constant. An output of the buffer memory 125 is outputted via an output terminal 126 so as to be transmitted over a communication network or recorded/reproduced on or from recording medium.

If the input signals are color component picture signals, made up of Y (luminance) signals and C (chroma) signals, the MC and DCT operations are performed on both the Y signal data and the C signal data. The C signals are made up of color difference signals $C_b$ and $C_r$ corresponding to so-called B-Y signals and R-Y signals, respectively. As for the numbers of samples or the sampling frequency, the ratio of $Y:C_b:C_r$ is set to 4:2:2, such that one $C_b$ pixel data and one $C_r$ pixel data are associated with two Y pixel data.

In decoding the signals, processed with the above-described MC-DCT hybrid coding operations, it is necessary to read data of a frame directly preceding the current frame from the frame memory in accordance with the motion vector to perform motion compensation thereon. On the other hand, in displaying the signals on a display unit, such as a cathode ray tube (CRT) monitor, it is necessary to read the data sequentially from the memory in accordance with the scanning operation for display.

The frame memory is made up of a number of, such as four, memory devices, such as DRAMs, and is adapted for reading out data from the memory devices by parallel reading with four bytes, as an example, as a word, at a rate of one byte from each memory device.

In accessing the data on the frame memory, such a word format may be contemplated in which two bytes, for example, of Y data and each one byte of the $C_b$ and $C_r$ data, totalling at four bytes, make up each word. Such word format dispenses with a buffer memory for display. However, a problem is raised that the buffer memory for adjusting the timing when summing the motion-compensated picture data to the inter-frame difference data is increased in capacity. On the other hand, if a word format convenient for MC processing such as a word format in which a word consisting only of four Y bytes is changed over to a word consisting only of four C bytes or vice versa as time elapses, is employed, it becomes necessary to provide a buffer memory for display while the number of times of data reading from the frame memory for MC processing is increased, even though the buffer memory for timing adjustment for MC processed data may be reduced in capacity.

SUMMARY OF THE INVENTION

In view of the above-depicted status of the art, it is an object of the present invention to provide a moving picture decoding device in which the buffer memory for display may be dispensed with and the number of times of data reading from the frame memory during MC processing is not increased, while the buffer memory for timing adjustment for motion-compensated data may be reduced in capacity.

In accordance with the present invention, there is provided a moving picture decoding device in which picture data is read from a picture memory responsive to a motion vector to perform decoding of a motion-compensated moving picture and in which the picture data is also read in a pre-set sequence from the picture memory for display. During motion compensation, picture data only of luminance signal components are read time-divisionally from the picture memory and picture data only of chroma signal components are also read time-divisionally from the picture memory, while, during display, the picture data of the luminance signal components and the picture data of the chroma signal components are read simultaneously from the picture memory. A word format as a unit of picture data accessing to the picture memory is changed over for the motion compensation and for display.

With the moving picture decoding device, signals encoded by a so-called MC-DCT hybrid coding system are entered as input signals. The inter-frame difference data produced on inverse DCT and picture data read out from the picture memory in accordance with the motion vector are summed together and the resulting sum signals are written in the picture memory.

The picture memory is made up of plural memory devices each having a first storage area for storing picture data of luminance signal components and a second storage area for storing picture data of chroma signal components. The operation of reading the picture data of the luminance signal components from the first storage area of all of the memory devices is changed over time-divisionally during motion compensation to the operation of reading the picture data of the chroma signal components from the second storage area of all of the memory devices. During display, the picture data of the luminance signal components are read from the first storage areas of one or more of the memory devices at the same time as the picture data of the chroma signal components are read from the second storage areas of the remaining memory devices.

During the motion compensation, a word consisting of m row by n column luminance signal component picture data is time-divisionally changed over on a two-dimensional screen to a word consisting of m row by n/2 column chroma signal component picture data.

Besides, two m row by n/2 column chroma signal component picture data in the word format during the motion compensation are written in memory devices different from the memory devices in which the luminance signal component picture data of the same row are written. Specifically, when simultaneously reading the Y data and the C data during the display, even row Y data are read from the memory devices M0 and M1, and the $C_b$ and $C_r$ data of the same even rows are read from the memory devices M2 and M3, while odd row Y data are read from the memory devices M2 and M3, and the $C_b$ and $C_r$ data of the same odd rows are read from the memory devices M0 and M1.

With the moving picture decoding device according to the present invention, picture data only of luminance signal components are read time-divisionally from the picture memory and picture data only of chroma signal components are also read time-divisionally from the picture memory during motion compensation, so that the buffer memory for timing matching with respect to the motion-compensated data may be reduced in capacity. Besides, the Y data and the C data are read simultaneously during the display, so that the buffer memory for display may be eliminated. In addition, by setting the word of the Y data during motion compensation, such as a 4-byte word, to a m row by n column word, such as a 2-row by 2 column word, the number of times of data reading per macro-block may be prevented from being increased as compared to the case in which each word is arranged as a one-row word, such as a 4-byte one-row word.

DETAILED DESCRIPTION OF THE PREFERRED EMBODIMENTS

Figure 2:
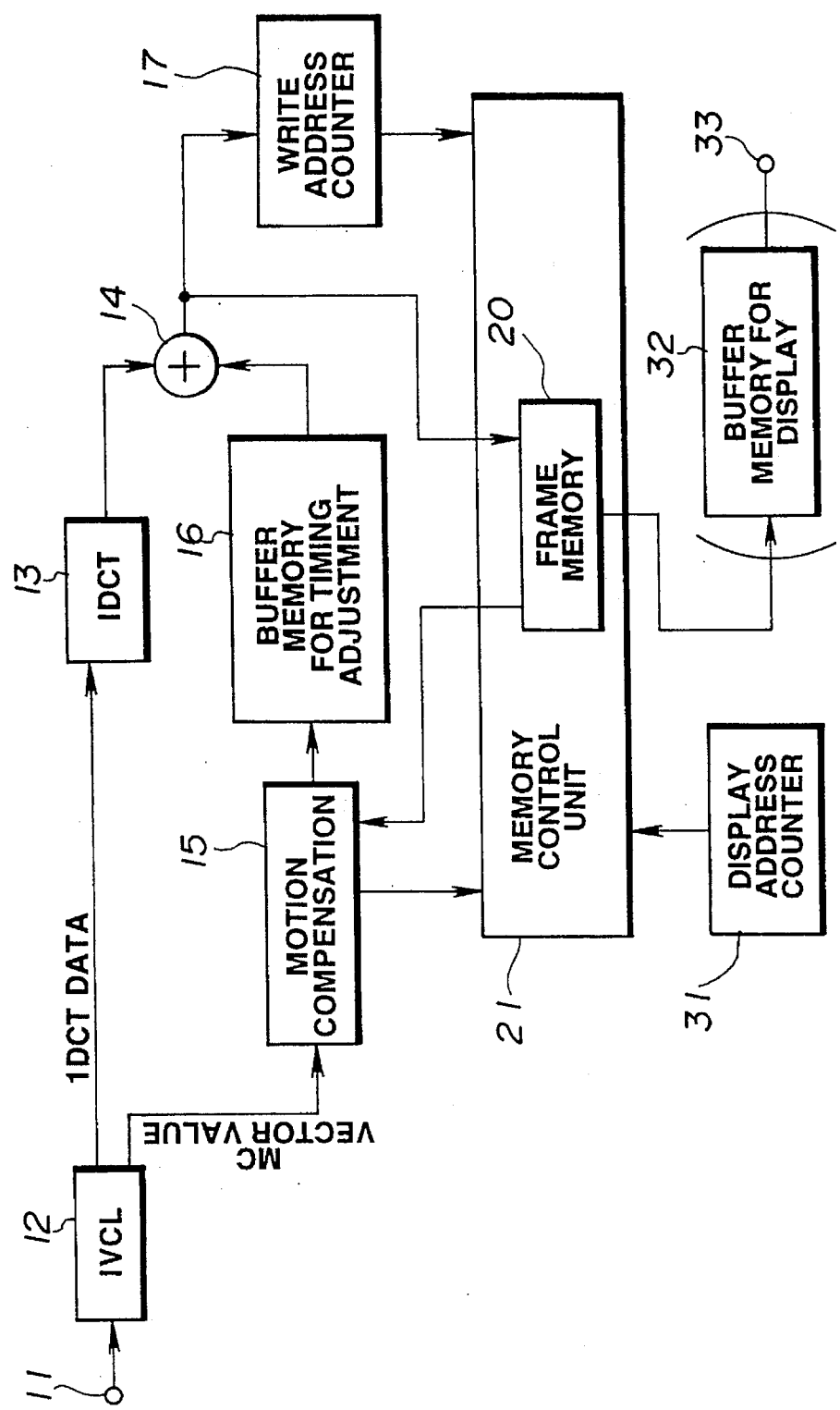
FIG. 2 is a block circuit diagram showing a schematic arrangement of a moving picture decoding device according to the present invention.

FIG. 2 shows, by a schematic block circuit diagram, an arrangement of an embodiment of a moving picture decoding device according to the present invention.

To an input terminal 11 of the present embodiment, shown in a block circuit diagram of FIG. 2, there is supplied a signal data string or so-called bit stream which has been encoded in accordance with e.g. the above-described MC-DCT coding. The input signal is also supplied to an inverse variable length coding or decoding circuit (IVLC) 12 for inverse variable length decoding for generating compressed data and motion vector data for motion compensation.

The compressed data from the IVLC circuit 12 is transmitted to an inverse DCT circuit 13 for an inverse DCT operation, that is a reverse operation of the DCT operation, before being supplied to an additive node 14. The motion vector data for motion compensation from the IVLC circuit 12 is supplied to a motion compensation circuit 15 from which a read address for a motion compensation block based on the motion compensation vector is supplied to a memory controller 21 of a frame memory 20 used as a picture memory. Data of the motion compensation block read from the frame memory 20 in accordance with the readout address and transmitted to the motion compensation circuit 15. The motion-compensated picture data from the motion compensation circuit 15 is transmitted via a timing-adjustment buffer memory 16 to the additive node 14.

Addition output data from the additive node 14 is supplied to the frame memory 20 so as to be written in locations designated by addresses from a write address counter 17 which is adapted for counting up at each output timing of the sum data from the additive node 14.

For sequentially reading picture data written in the frame memory 20 for display on a display unit, such as a CRT monitor, address data from a display address counter 31 are transmitted to a memory control unit 21 and picture data read in accordance with the display addresses are occasionally outputted at an output terminal 33 via a display buffer memory 32.

In the present embodiment, the word format of a word as a readout unit for picture data for motion compensation and that of a word as a readout unit for picture data for display are changed over to a respective proper word format. To this end, the frame memory 20 and the memory control unit 21 are arranged as shown in detail in FIG. 3 to realize the relation between the memory and the picture data shown in FIGS. 4 to 6.

Figure 3:
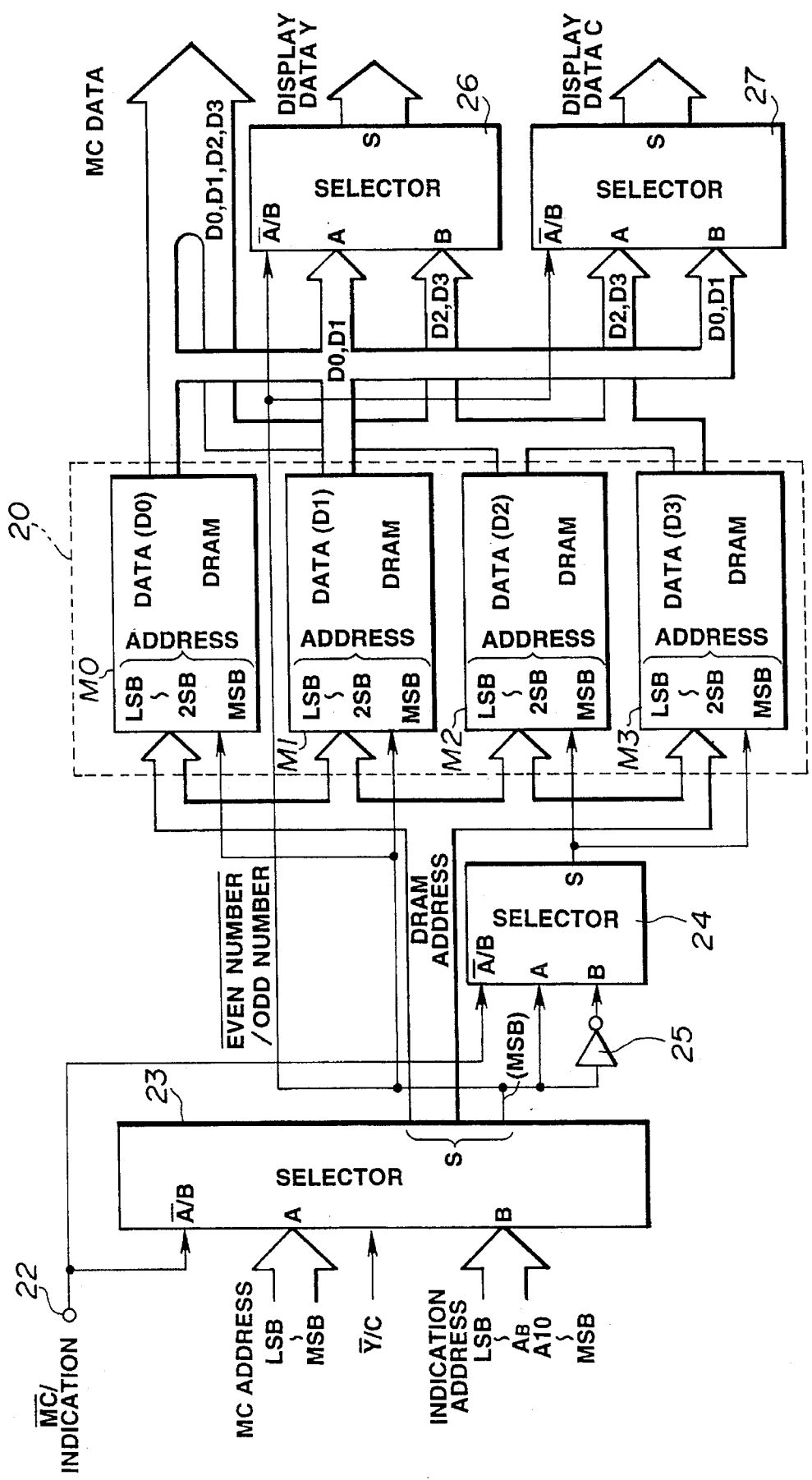
FIG. 3 is a block circuit diagram showing a concrete arrangement of a frame memory and a memory control unit making up the moving picture decoding device according to the present invention.

FIG. 3 shows an example of a concrete arrangement for memory control in which an emphasis of representation is placed on readout addresses for the frame memory 20 and readout data from the frame memory 20. A changeover control signals for changing over the motion compensation (MC) to the display and vice versa is supplied to an input terminal 22. The changeover signal for MC/display switching is supplied to each of changeover control terminals of selectors 23, 24.

As a select input A of the selector 23, the bits of an address for reading picture data for motion compensation (MC) from the least significant bit (LSB) up to the most significant bit (MSB) are supplied as MC address data. In more detail, these bits are made up by 8 bits for coordinate points X1 to X8 of a column excluding X0, 8 bits for coordinate points Y1 to Y8 of a row excluding Y0 and a 1 bit for a Y data/C data selection flag. As a select input B of the selector 23, the bits of an address for reading display picture data from the least significant bit (LSB) up to the most significant bit (MSB) are supplied as displayed address data. In more detail, these bits are made up by 8 bits for coordinate points X1 to X8 of a column excluding X0, 8 bits for coordinate points Y1 to Y8 of a row excluding X0 and 1 bit for Y0 data. One of these select inputs is selected responsive to the changeover control signal so as to be outputted at an S output. The even and odd rows for the MC addresses are represented by the Y/C bit which is supplied as a changeover control signal for selectors 26, 27 as later explained. Meanwhile, if the pixels of the display screen are represented by a two-dimensional matrix of display addresses, in a manner not shown, the lower most bit of a row address, such as an address $A_g$, may be used as a changeover control signal for indicating an even row or an odd row.

The S output of the selector 23 is supplied to memory devices, such as DRAMs M0, M1, M2 and M3 making up the frame memory 20 as address data for the respective DRAMs (DRAM addresses). It should be noted that the S output of the selector 24 is employed as each of the MSBs of the addresses of the memory devices M2 and M3.

The MSB of the S output of the selector 23 is supplied as a select input A of the selector 24, while a complement of the S output is supplied via an invertor (NOT gate) 25 as a select input B of the selector 24. One of these select inputs is selected depending on the MC/display changeover control signal so as to be supplied as the MSBs of the address data for the memory devices M2 or M3.

The picture data read from the memory devices M0, M1, M2 and M3 are taken out as motion compensation (MC) data. Besides, the picture data read from the memory devices M0, M1 are supplied as a select input A for the selector 26 and a select input B for the selector 27, respectively, while the picture data read from the memory devices M2, M3 are supplied as a select input B for the selector 26 and a select input A for the selector 27, respectively. The selectors 26, 27 select one of the select A input or the select B input, depending on the lower most bit of the row outputted from the selector 23 during the display, that is the bit indicating the even row or the odd row. The S output from the selector 26 and the S output from the selector 27 is employed as a luminance (Y) component and as a chroma (C) component during display, respectively.

Figure 4:
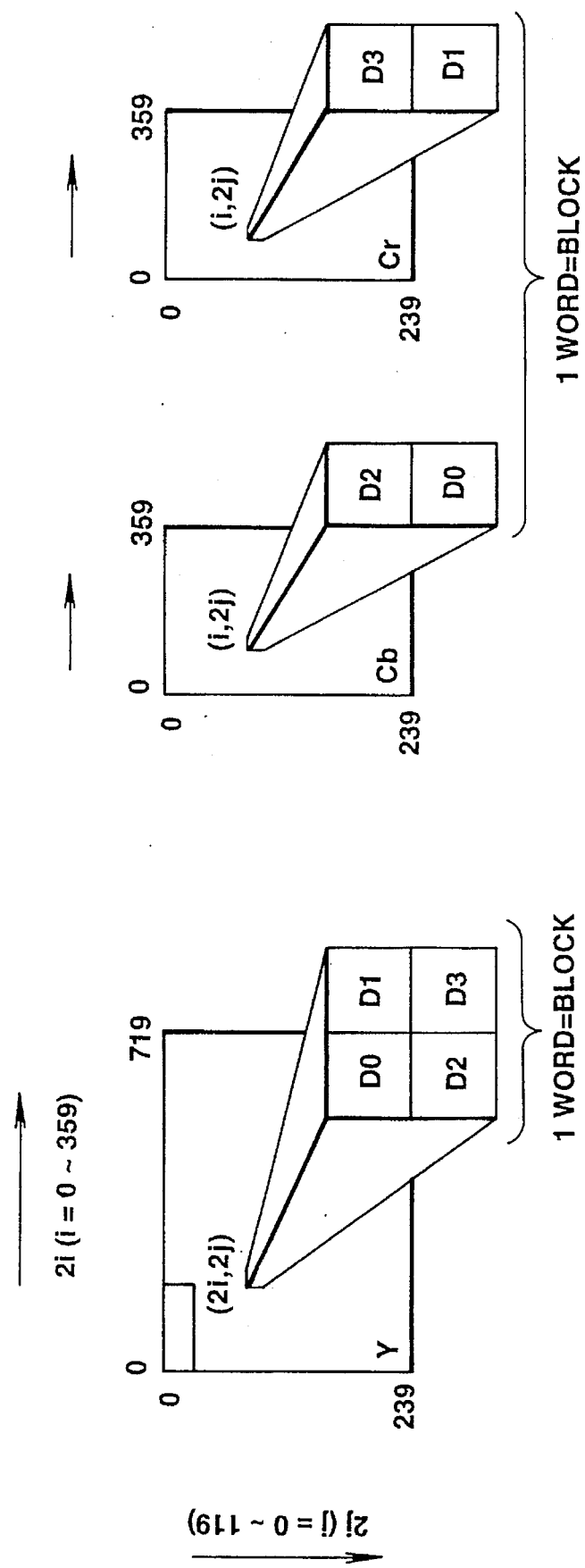
FIG. 4 shows a word format for the moving picture decoding device according to the present invention.
Figure 5:
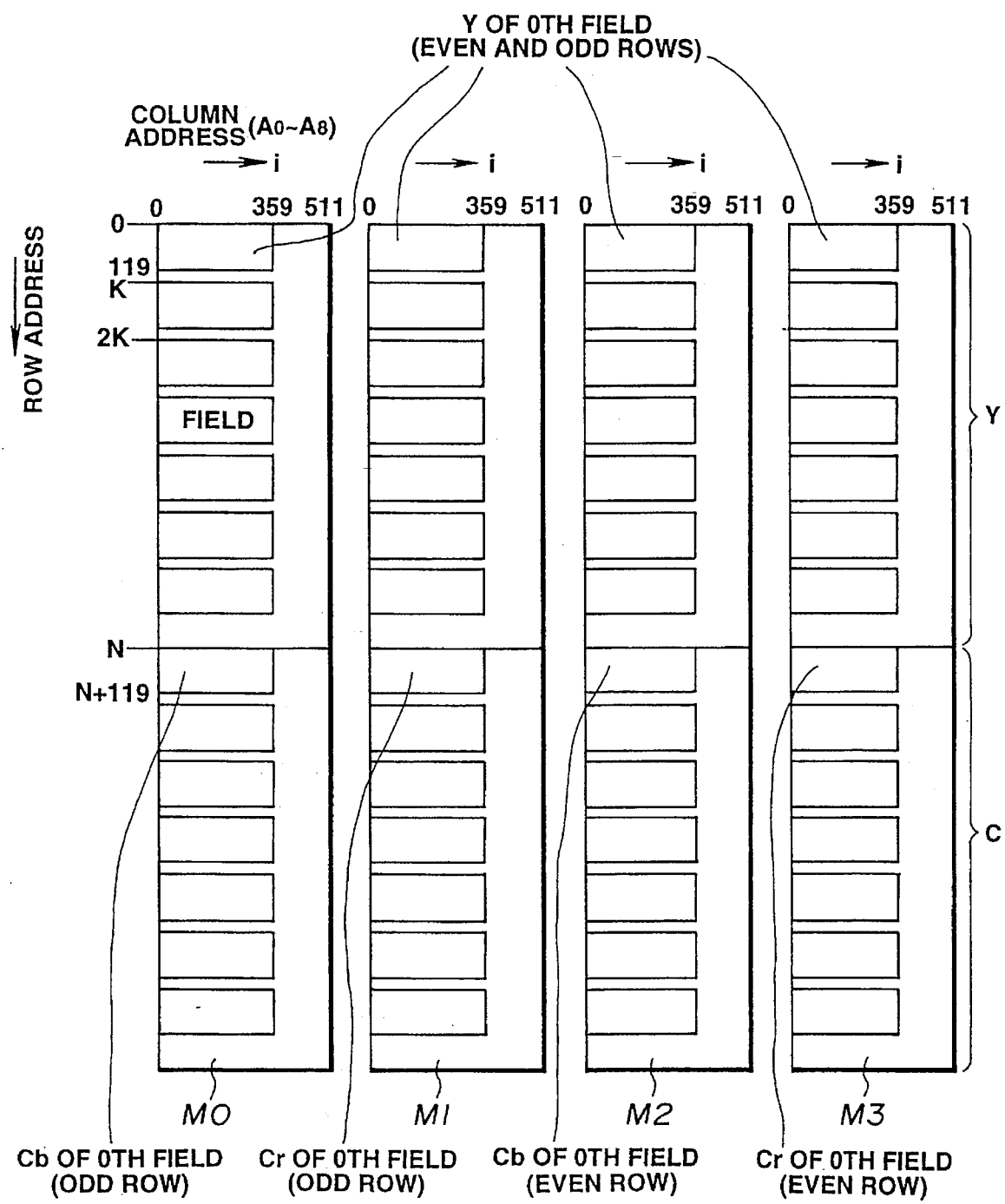
FIG. 5 illustrates an example of a memory map of a frame memory of the moving picture decoding device according to the present invention.

If the picture data read from the four memory devices (DRAMs) M0, M1, M2 and M3 making up the frame memory 20 are indicated as D0, D1, D2 and D3, respectively, the relation between the pixel data D0, D1, D2 and D3 and the pixel positions on a one-field two-dimensional array is as shown in FIG. 4, in which two words during the MC processing are shown. The memory map for the memory devices M0 M1, M2 and M3 is as shown in FIG. 5. The word format during the MC processing for two words and the word format during the display for two words are shown at FIGS. 6(A) and 6(B), respectively.

Each one byte of the picture data is read from each of the four memory devices M0, M1, M2 and M3, thus a sum total of 4 bytes, are read out simultaneously. These four bytes make up a word as a picture data read unit. That is, a word as a picture data accessing unit in general means a group of picture data in the memory devices of the picture memory accessed simultaneously. The one word may be set to the number of bytes other than the four bytes, such as 8 or 16 bytes.

Figure 6:
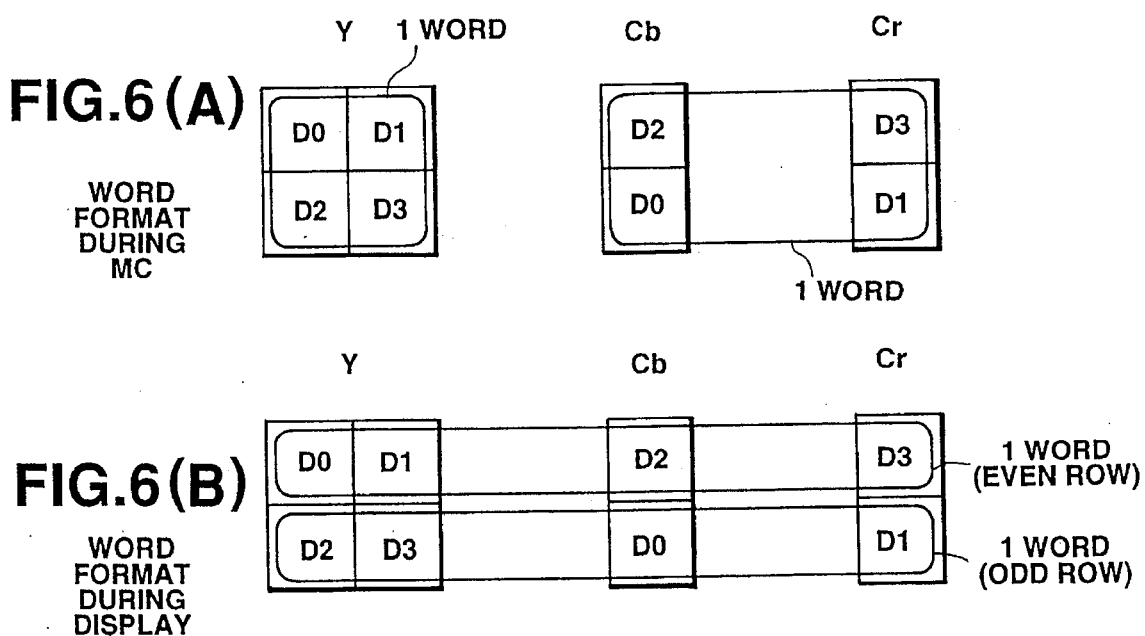
FIGS. 6(A) and 6(B) illustrate the state of switching of the word format between that during the motion compensation (MC) and that during display.

In the present embodiment, the word format during the MC processing is set so as to be different from that during display, as shown at A and B in FIG. 6, in such a manner that the word format suited to the MC processing or display may be employed for the MC processing or display, respectively. The main features of these word formats reside in that the word composed only of the luminance (Y) components is time-divisionally changed over to the word composed only of the chroma (C) components or vice versa during the MC processing, while the word displayed is the word composed of the Y and C components.

Reference is had to FIG. 4 for more detailed explanation. As for the Y data, that is picture data of the luminance signal component, 2 vertical pixels by 2 horizontal pixels are associated with coordinate points (2i, 2j), where 2i denote the horizontal positions (i=0 to 359) and 2j denote the vertical positions (2j=0 to 119), each frame being made up by 720 horizontal pixels by 240 vertical pixels. These 2 vertical pixels by 2 horizontal pixels are associated with the data D0, D1, D2 and D3 of the memory devices M0, M1, M2 and M3, respectively. As for the $C_b$ data, that is picture data of the chroma components $C_b$, the pixel data D2, D0 of the memory devices M2, M0 in an array of two vertical pixels by one horizontal pixel are associated with coordinate points (i, 2j) in a two-dimensional area of a frame made up of 360 horizontal pixels by 240 vertical pixels, where i denotes the horizontal position (i=0 to 359) and 2j denotes the vertical position (j=0 to 119). As for the $C_r$ data, that is picture data of the chroma components $C_r$, the data D3, D1 of the memory devices M3, M1 in an array of two vertical pixels by one horizontal pixel are associated with coordinate points (i, 2j) in the two-dimensional area of the frame made up of 360 horizontal pixels by 240 vertical pixels, where i denotes the horizontal position (i=0 to 359) and 2j denotes the vertical position (j=0 to 119).

It is seen from FIG. 4 that the mapping to the memory devices of one-field Y, $C_b$ and $C_r$ data is so designed that the memory devices M0 and M1 in which the Y data D0, D1, for example, of a given row, such as row 2j, are recorded are not the same as the memory devices M2 and M3 in which the Cb data D2, and the Cr data D3 of the same row, are recorded.

FIG. 5 shows an exemplary memory map for the four memory devices M0, M1, M2 and M3. In FIG. 4, each of the memory devices M0, M1, M2 and M3 has a Y data storage area and a C ($C_b$, $C_r$) data storage area, each having a storage capacity equal to one-half the total storage capacity. In the Y data storage area of the memory device M0, Y data for even columns and even rows, corresponding to the coordinate indications 2i and 2j, are stored, while, in the Y data storage area of the memory device M1, Y data for odd columns and even rows, corresponding to the coordinate indications 2i+1 and 2j, are stored. In the Y data storage area of the memory device M2, Y data for even columns and odd rows, corresponding to the coordinate indications 2i and 2j+1, are stored, while, in the Y data storage area of the memory device M3, Y data for odd columns and odd rows, corresponding to the coordinate indications 2i+1 and 2j+1, are stored. In the C data storage areas of the memory devices M0, M1, M2 and M3, $C_b$ data for odd rows, $C_r$ data for odd rows, $C_b$ data for even rows and $C_r$ data for even rows are stored, respectively.

Returning to FIG. 3, assuming that the memory devices, mapped as described above, are employed, and the operation is that for motion compensation, the selector 23 selects and outputs the MC address at the select A input, while the selector 24 outputs the MSB without complementation. Consequently, during the motion compensation for the Y data, the Y data D0, D1, D2 and D3 are read from the Y data storage areas of the memory devices M0, M1 M2 and M3, respectively, while, during the motion compensation for the C data ($C_b$ and $C_r$ data), the $C_b$ data D0 and D2 and the $C_r$ data D3 and D1 are read from the respective C data storage areas of the memory devices M0, M1, M2 and M3, respectively, these data being outputted as the MC data.

As for the operation during display, the selector 23 selects the display address of the select input B to issue the S output, while the selector 24 issues the output S the MSB of which has been complemented by the invertor 25. On the other hand, the lower most bit of the row of the input display address, that is the bit indicating whether the row is an even row or an odd row, such as the bit $A_g$, is separately taken out from the selector 23 so as to be supplied to changeover control terminals of the selectors 26, 27. If the odd/even row indicating bit is 0, that is if the row is even, the selector 26 outputs picture data from the memory devices M0 and M1, that is Y data D0 and D1, while the selector 27 outputs picture data from the memory devices M2 and M3, that is $C_b$ and $C_r$ data D2 and D3. If the odd/even row indicating bit is 1, that is if the row is odd, the selector 26 outputs picture data from the memory devices M2 and M3, that is Y data D2 and D3, while the selector 27 outputs picture data from the memory devices M2 and M3, that is $C_b$ and $C_r$ data D0 and D1.

The above may be summarized as shown at FIGS. 6(A) and 6(B).

That is, during the MC operation, a word consisting only of Y data D0, D1, D2 and D3 and a word consisting only of C ($C_b$ and $C_r$) data D2, D3, D0 and D1 are read out time-divisionally, while, during display, a word consisting of the Y data D0 and D1 and the C ($C_b$ and $C_r$) data D2 and D3 is read for even rows and a word consisting of the Y data D2 and D3 and the C ($C_b$ and $C_r$) data D0 and D1 is read for odd rows.

Figure 1:
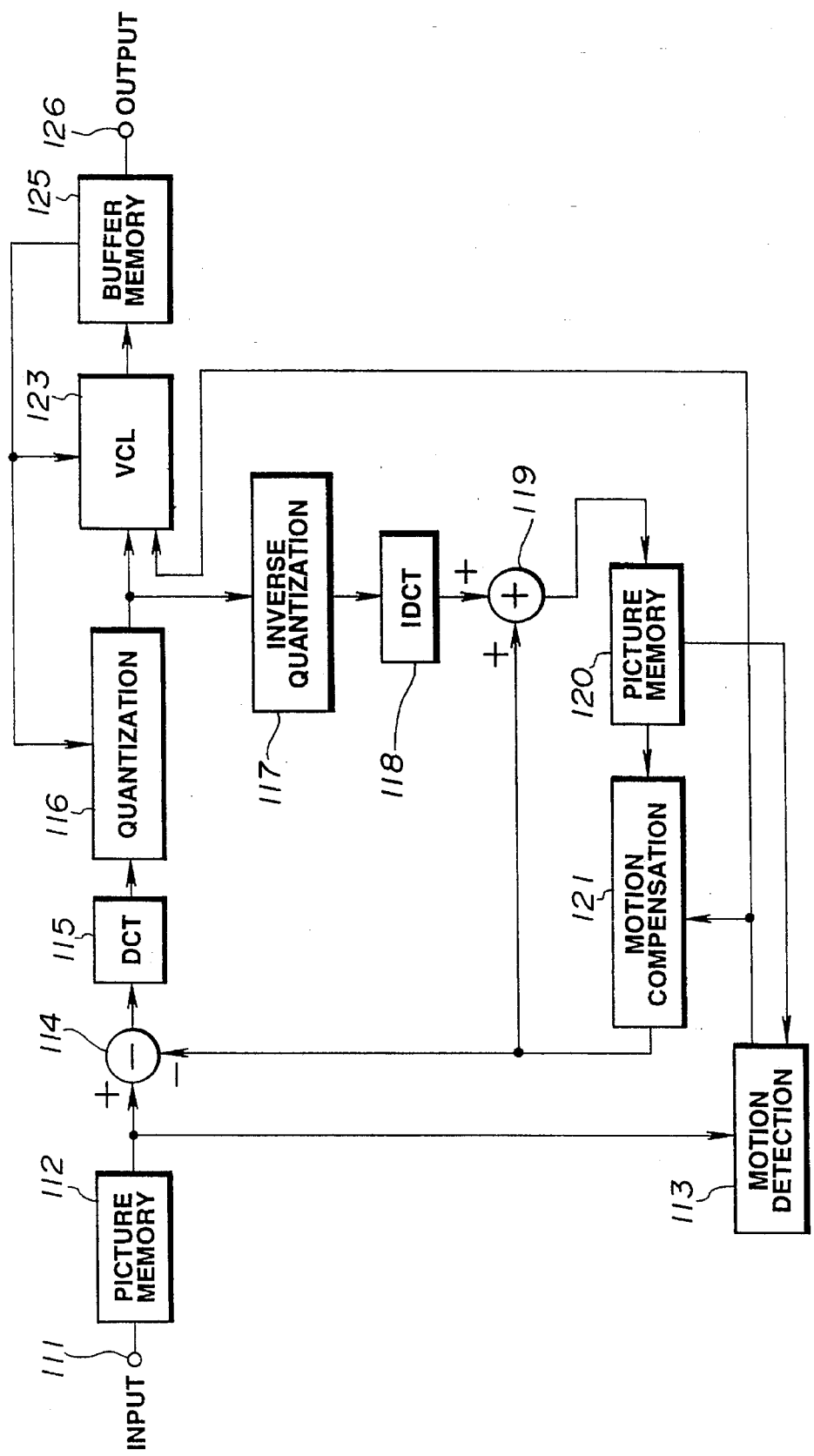
FIG. 1 is a block circuit diagram showing an example of a basic arrangement of a motion compensation (MC) -discrete cosine transform (DCT) hybrid encoding system.

If the word format shown at A in FIG. 6 is employed, the buffer memory for display 32 shown in FIG. 2 may be eliminated and the buffer memory for timing adjustment shown in FIG. 1 may be reduced in capacity, while the number of times of data reading per macro-block during motion compensation may be diminished. The explanation of the macro-block is now made by referring to FIG. 7.

Figure 7:
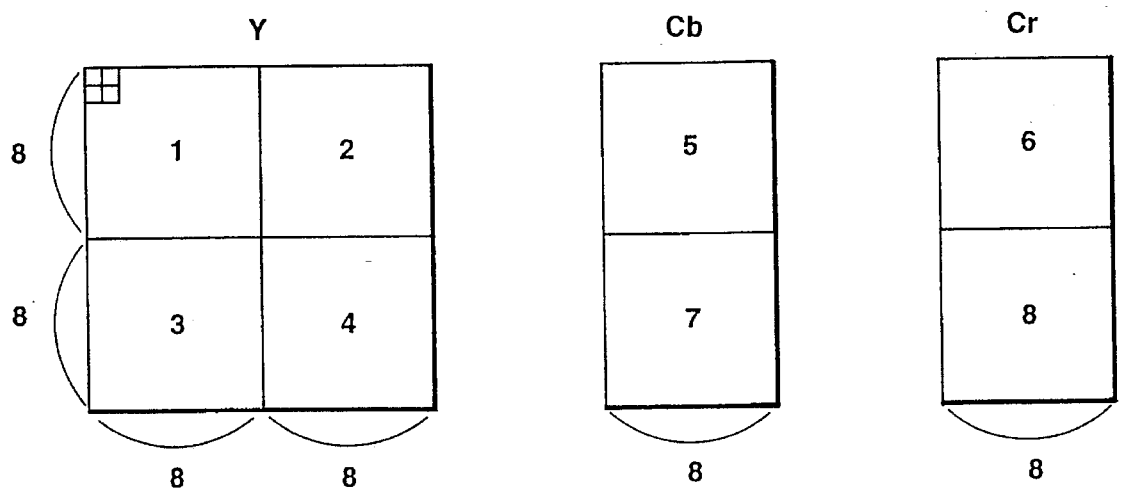
FIG. 7 illustrates macro-blocks for transfer of inter-frame difference data of the moving picture decoding device according to the present invention.

FIG. 7 shows the transfer sequence of picture data to the IDCT circuit 13 in the circuit arrangement of FIG. 2, that is the inter-frame difference data, by numerals 1 to 8. The eight blocks, each consisting of 8×8 pixels, make up a macro-block. The capacity of the buffer memory for timing adjustment 16 shown in FIG. 2 may be reduced by first performing the processing of the word consisting only of Y data, followed by the processing of the word consisting only of C ($C_b$ and $C_r$) data, in accordance with the data transfer sequence shown in FIG. 7. On the other hand, the number of times of data reading per macro-block may be prevented from being increased as compared to that with the conventional word format.

For clarifying the operation and effect of the present embodiment, conventional data accessing of the frame memory is explained.

Figure 8:
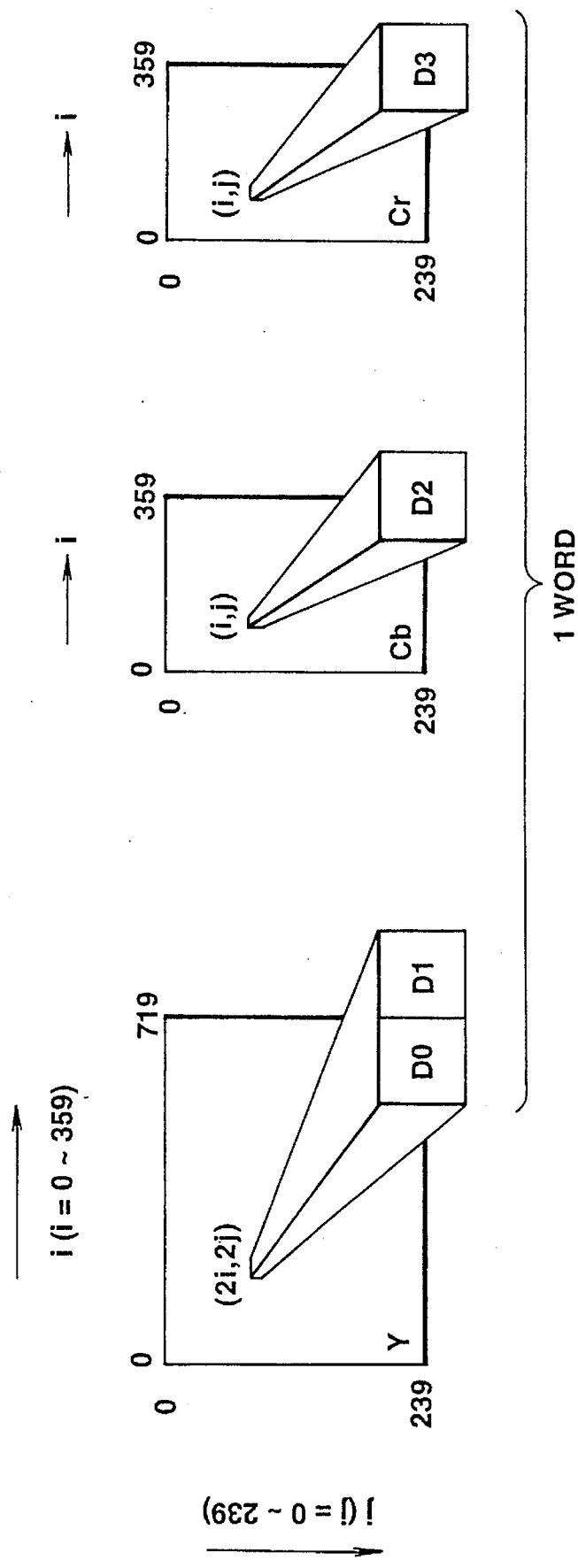
FIG. 8 illustrates an example of a conventional word format suited to display.

FIG. 8 shows as a word format suited to display, an illustrative word format in which Y data is formed by two bytes of D0 and D1, $C_b$ data is one byte of D2 and $C_r$ data is one D3 byte. In such case, it suffices to employ the memory devices M0 and M1, the memory device M2 and the memory device M3, for storage exclusively of the Y data, $C_b$ data and the $C_r$ data, respectively.

Figure 9:
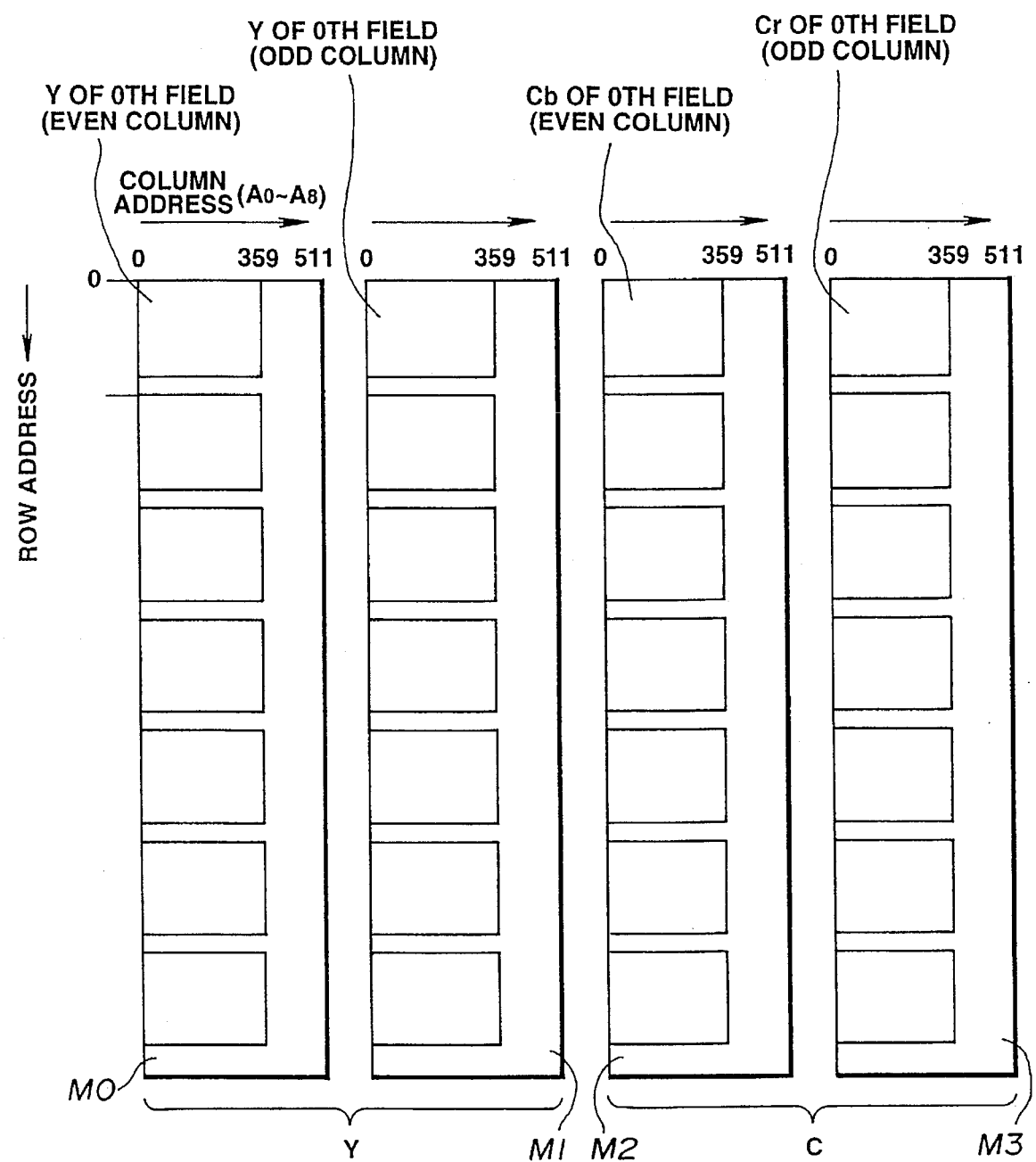
FIG. 9 illustrates a memory map of every memory device of the frame memory in case of using the word format shown in FIG. 8.
Figure 10:
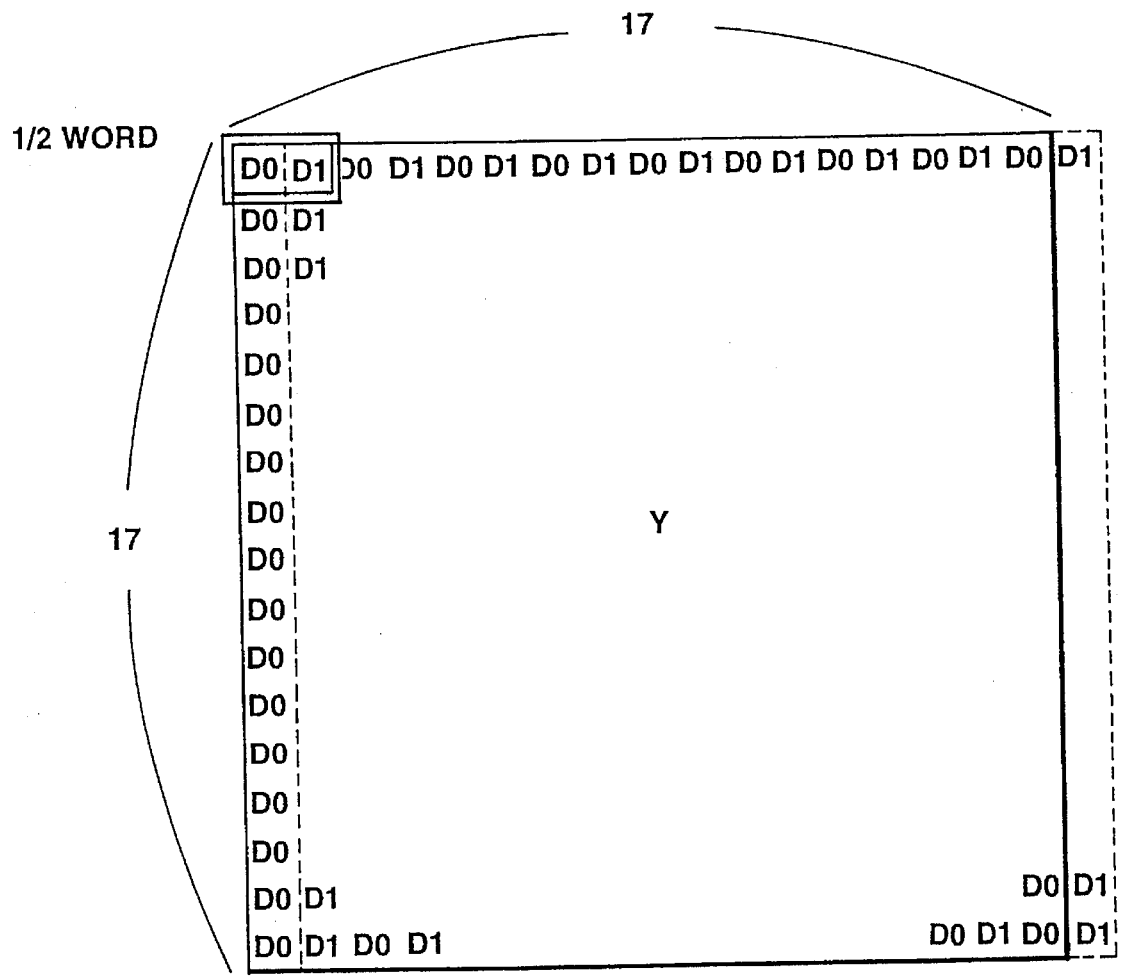
FIG. 10 illustrates the number of times of reading per macro-block during MC processing in case of using the word format shown in FIG. 8.

If such word format, shown in FIG. 8, is employed, the number of times of data reading on the frame memory during motion compensation may be diminished, as shown in FIG. 10. That is, while the Y data macro-block shown in FIG. 7 is made up of 16×16 pixels, the motion vector for motion compensation is expressed on the basis of 0.5 pixel, and hence it becomes necessary to take a mean value between two pixels if there is a fraction number of 0.5. Consequently, an area of 17×17 pixels has to be read. With the word format shown in FIG. 8, data shown by a solid line in FIG. 9 may be employed when the horizontal component $V_x$ (the component along the x-axis) of the motion vector is 0 or 0.5. On the other hand, if $V_x$ is 1 or 1.5, data indicated by a broken line may be employed, while, if $V_x$ is 2, 2 is added to the column address of each of the memory devices M0 to M3 to perform the same operation as that for $V_x$ equal to 0. Since the data D0 to D3 are collectively read as one word, data reading in the column direction is carried out 9 times, while data reading in the row direction is carried out 17 times, so that the number of times of data reading is equal to 17×9=153. The Y data and the C data are read simultaneously. Thus the number of times of data reading per macro-block in FIG. 7 becomes equal to 153.

However, if the word format shown in FIG. 8 is employed, in which the Y data and the C data are read simultaneously, the memory capacity of 8 blocks corresponding to 512 bytes is necessary to provide for the buffer memory for timing adjustment 16 of FIG. 2 for achieving timing adjustment with respect to data transfer from the IDCT circuit 13 to the additive node 14 in the transfer sequence shown in FIG. 2.

Figure 11:
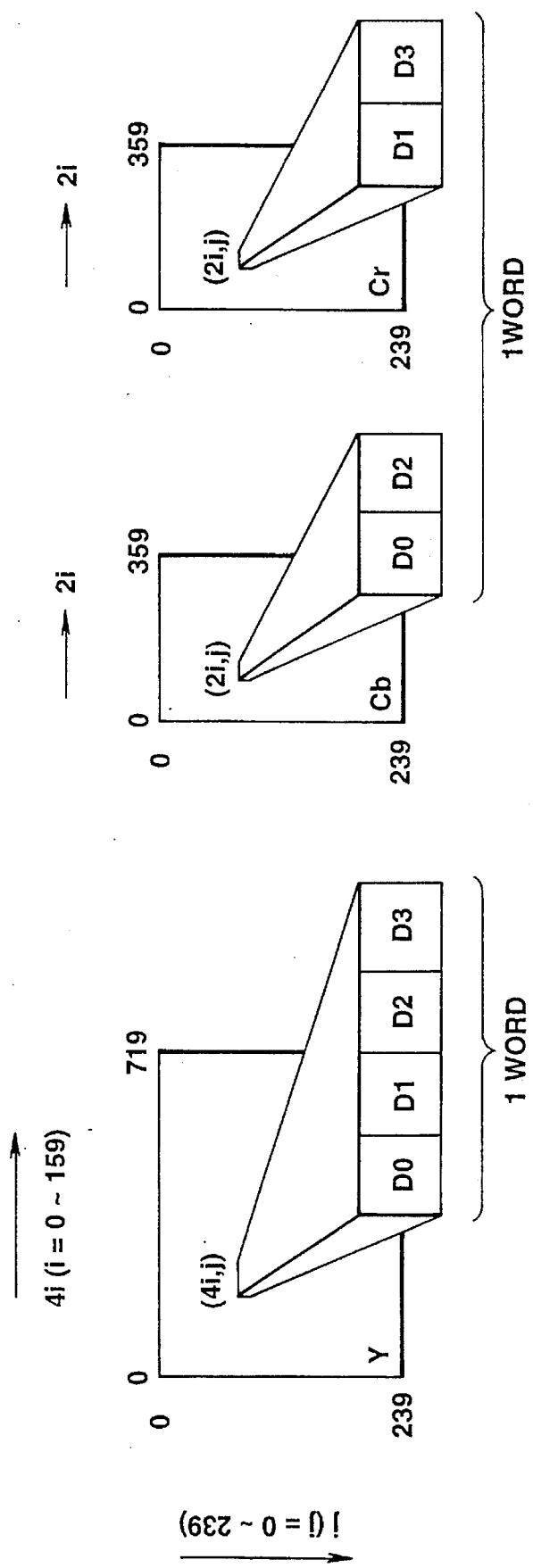
FIG. 11 illustrates an example of a conventional word format suited to MC processing.
Figure 12:
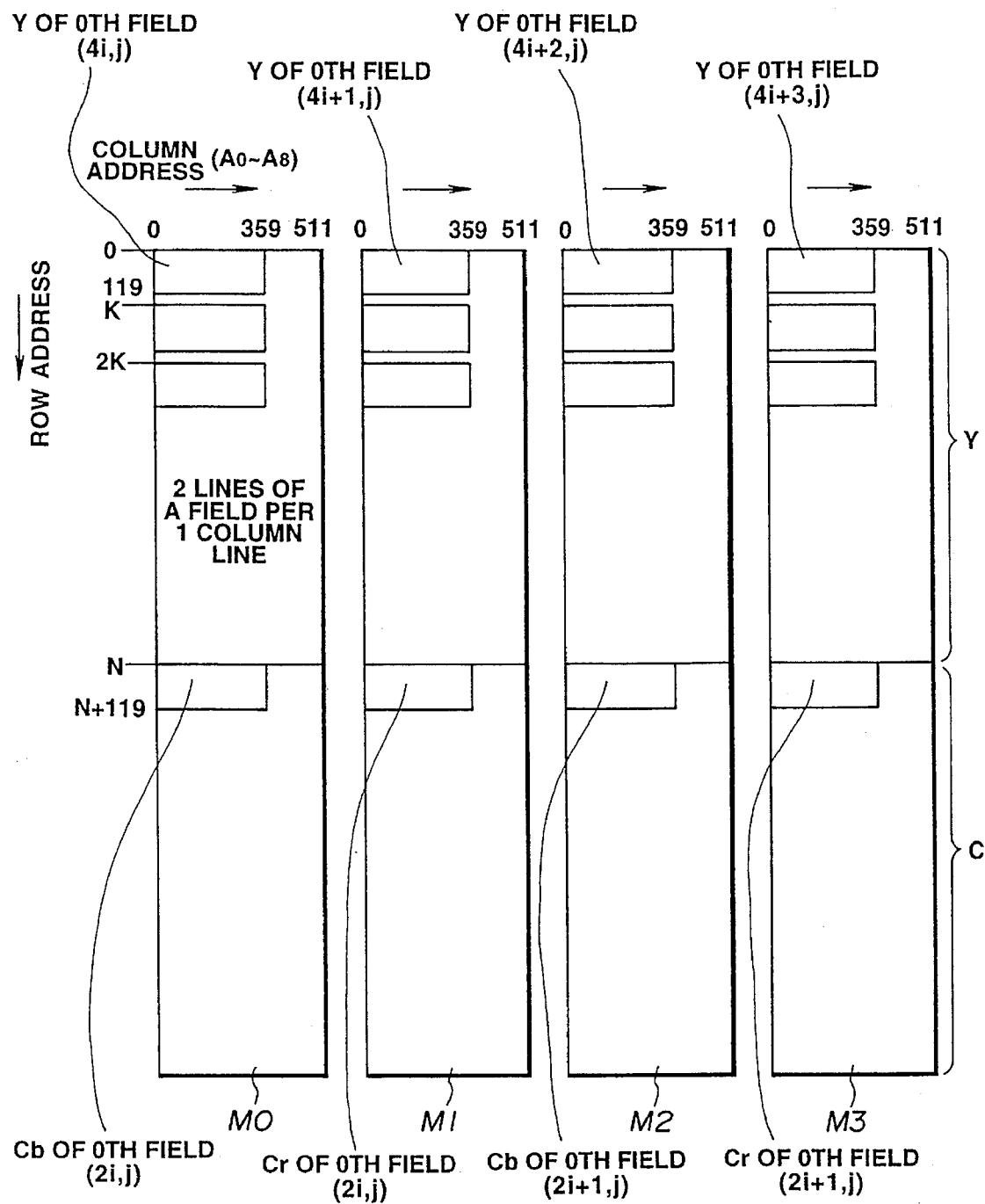
FIG. 12 illustrates a memory map of every memory device of the frame memory in case of using the word format shown in FIG. 11.

It may also be contemplated to employ a word consisting only of 4 bytes of Y data and a word consisting only of 4 bytes of C ($C_b$ and $C_r$) data, as shown in FIG. 11, as a word format suited to motion compensation, or as a word format which lends itself to reduction in the capacity of the timing adjustment buffer memory 16. In such case, the capacity of the timing adjustment buffer memory 16 of 4 blocks corresponding to 256 bytes suffices if the processing of the word consisting only of the Y data is performed first and that of the word consisting only of the C data is performed subsequently in accordance with the transfer sequence of the data supplied to the IDCT circuit 13 shown in FIG. 7. FIG. 12 shows an example of the memory map for the memory devices M0, M1, M2 and M3 in such case. It is noted that each of the memory devices has a Y data storage area and a C data storage area.

Figure 13:
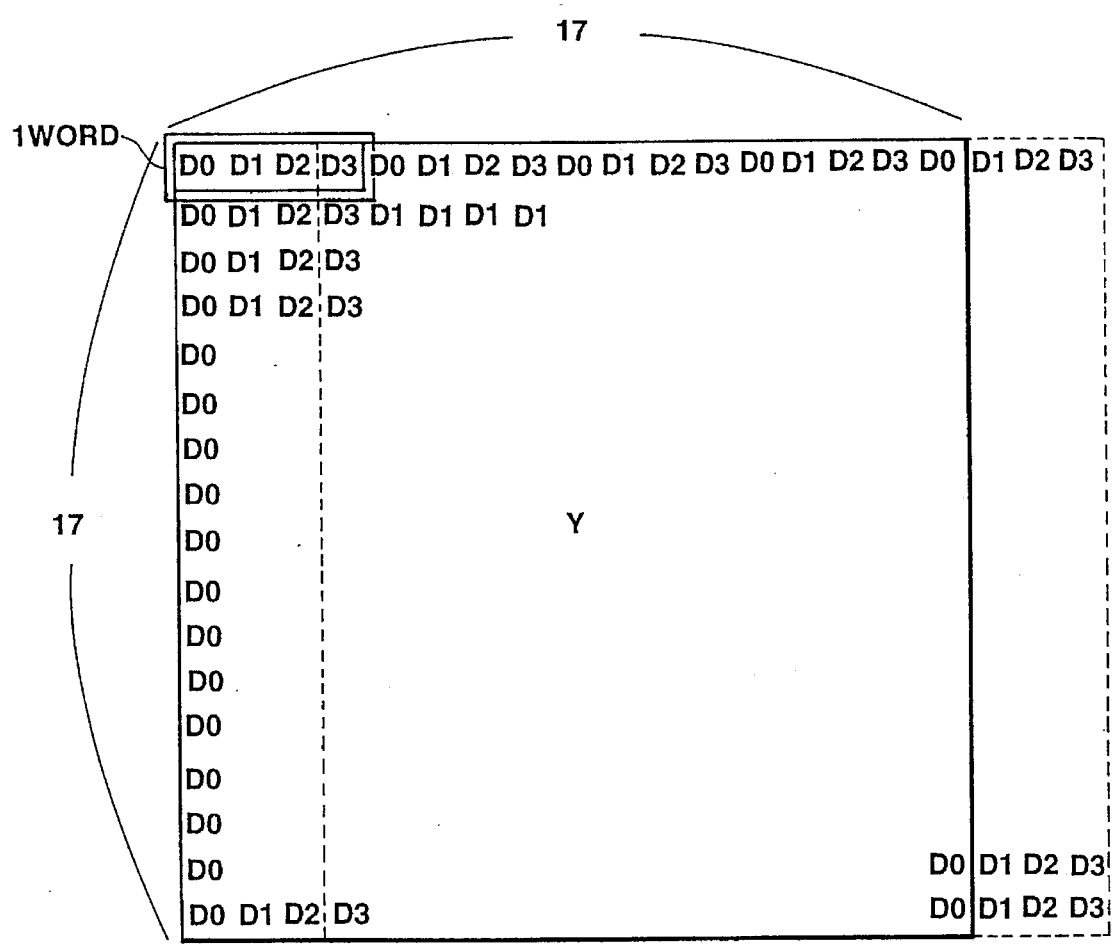
FIG. 13 illustrates the number of times of reading per macro-block during MC processing in case of adoption of the word format shown in FIG. 11.

However, if the word format as shown in FIG. 11 is employed, the number of times of data reading on the frame memory per macro-block is increased, as may be seen from FIG. 12. That is, if the horizontal component (x-component) of the motion vector $V_x$ is 0 or 0.5, solid-line data shown in FIG. 13 is employed, while, if $V_x$ is 3 or 3.5, broken-line data shown in FIG. 13 is employed. If $V_x$ is in range of from 1 and 2.5, data intermediate between the solid and broken lines are employed. If $V_x$ is 4, 2 is added to the column addresses of the memory devices M0 to M3 to perform an operation similar to that when $V_x$ is 0. Since the data D0 to D3 are collectively read as one word, data reading in the column direction is made 5 times, while data reading in the row direction is made 17 times, so that the number of times of data reading becomes equal to 17×5=85. Besides, since both the Y data and the C data need to be read, the number of times of data reading per macro-block in FIG. 7 becomes equal to 170.

Besides, if the word format shown in FIG. 11 is employed, the capacity of 4 bytes or more is necessary to provide for the display buffer memory 32 shown in FIG. 2, because the Y data and the C data then cannot be read simultaneously during the display.

Conversely, if the word format shown in FIG. 4, that is in FIGS. 6A and 6B, is employed, the defect proper to the word format of FIGS. 8 or 11 may be resolved.

That is, by reading the Y and C data simultaneously during the display as shown at B in FIG. 6, the buffer memory for display 32 may be eliminated. Besides, by time-divisionally reading only the Y data or the C data during the MC processing as shown at A in FIG. 5, the capacity of the buffer memory for timing adjustment 16 may be reduced to 4 blocks corresponding to 256 bytes. In addition, the number of times of data reading per macro-block during the MC processing may be diminished as compared to that in the case of employing the word format shown in FIG. 11.

Figure 14:
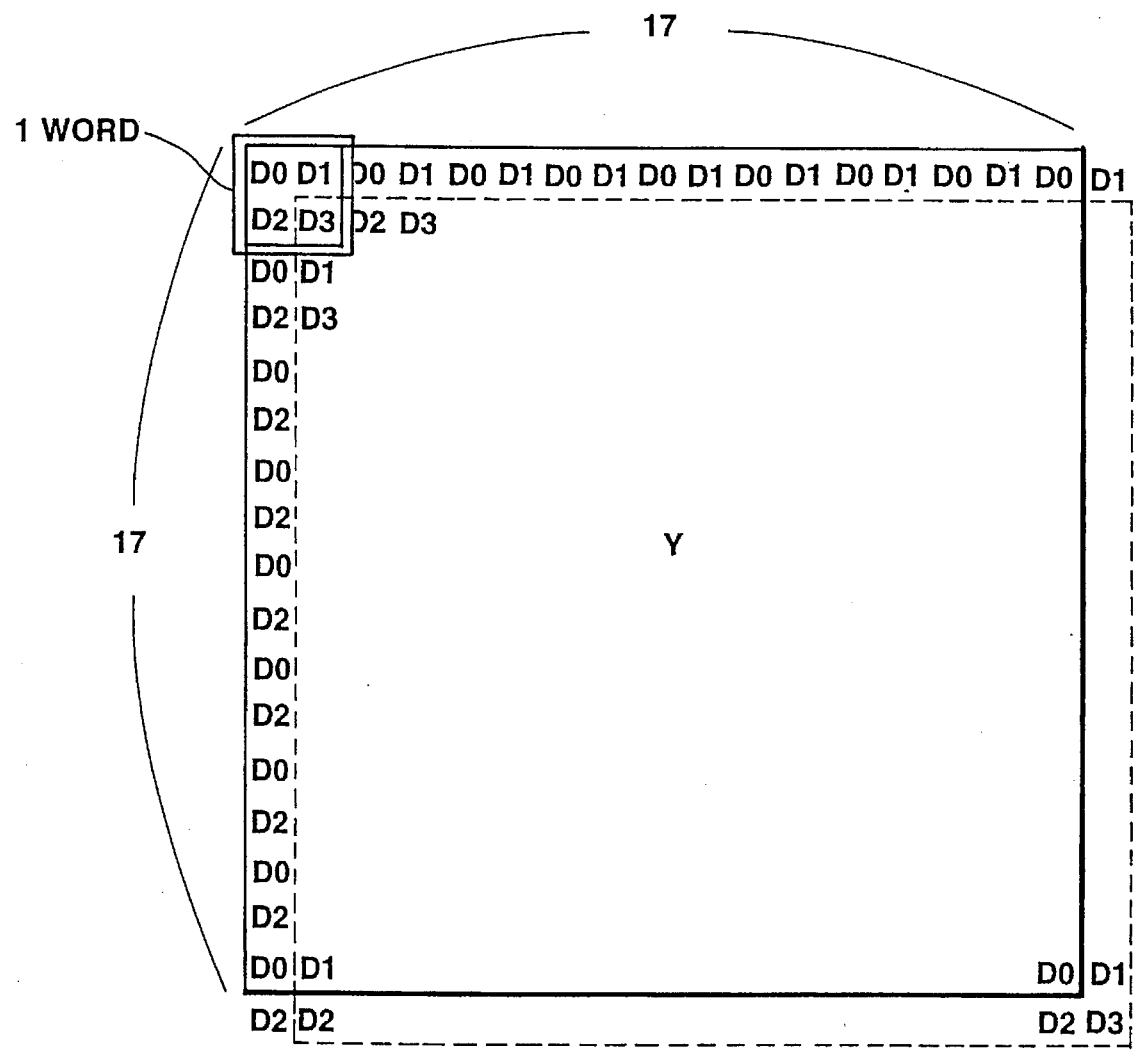
FIG. 14 illustrates the number of times of reading per macro-block during MC processing in case of using the word format shown in FIG. 11.

FIG. 14 illustrates the reading of the Y macro-block data. For assuring an area of 17×17 pixels for motion compensation, solid-line data shown in FIG. 14 may be employed if the horizontal component (x-direction component) $V_x$ of the motion vector is 0 or 0.5, while broken-line data shown in FIG. 14 may be employed if the horizontal component (x-direction component) $V_x$ of the motion vector is 1 or 1.5. If $V_x$ is equal to 2, it suffices if 1 is added to the column addresses of the memory devices M0 to M3 to perform an operation for $V_x$ equal to 0. On the other hand, solid-line data shown in FIG. 14 may be employed if the vertical component (y-direction component) $V_y$ of the motion vector is 0 or 0.5, while broken-line data shown in FIG. 14 may be employed if the vertical component (y-direction component) $V_y$ of the motion vector is 1 or 1.5. If $V_x$ is equal to 2, it suffices if 1 is added to the row addresses of the memory devices M0 to M3 to perform an operation for $V_y$ equal to 0. Since the data D0 to D3 are collectively read as one word, data reading in the column direction is made 9 times, while data reading in the row direction is made 9 times, so that the number of times of data reading becomes equal to 9×9=81. Besides, since both the Y data and the C data need to be read, the number of times of data reading per macro-block in FIG. 7 becomes equal to 81×2=170. The above may be summarized as shown in the following Table 1.

TABLE 1

| | buffer memory for timing adjustment 16 | buffer memory for display 32 | number of times of data reading per macro-block (during MC) |
| --- | --- | --- | --- |
| word format of FIGS. 3 and 4 | 4 blocks (256 bytes) | unnecessary | 162 |
| word format of FIGS. 7 and 8 | 8 blocks (512 bytes) | unnecessary | 153 |
| word format of FIGS. 10 and 11 | 4 blocks (256 bytes) | necessary (4 bytes or more) | 170 |

It is seen from the above Table that the capacity of the buffer memory for timing adjustment 16 may be reduced to 4 blocks corresponding to 256 bytes, while the buffer memory for display 32 may be eliminated. On the other hand, while the number of times of data reading per macro-block during the MC processing is not so small as 153 for the word format shown in FIG. 8, it is significantly less than 170 for the word format shown in FIG. 10.

It is to be noted that the present invention is not limited to the above-described embodiments. For example, the number of bytes per word is not limited to 4, but may be set to an arbitrary value, such as 8 or 16. Although the word array of 2 rows by 2 columns is used for motion compensation, a word array of m rows by n columns, where preferably m is an integer not less than 2 and n is an even number, may also be employed.

What is claimed is:

1. A moving picture decoding device, comprising:

decoding means for generating decoded moving picture data from encoded moving picture data, the decoded moving picture data including luminance signal component data and chroma signal component data, the decoding means including an inverse variable length coder having an input for receipt of said encoded moving picture data and a first output coupled to an input of an inverse discrete cosine transforming means, the inverse discrete cosine transforming means operative to output a plurality of luminance blocks and operative to output a plurality of chroma blocks after outputting the luminance blocks in each macroblock;

memory means for storing decoded moving picture data;

motion compensation means coupled to the memory means and to a second output of the inverse variable length coder, for generating motion compensated moving picture data in response to motion vector data generated by the inverse variable length coder;

buffer memory means for delaying transmission of the motion compensated moving picture data;

adding means for adding an output of the inverse discrete cosine transforming means to the delayed motion compensated moving picture data, the adding means having an output coupled to the memory means; and selector means for selecting from a plurality of word formats for reading the stored decoded moving picture data, wherein a plurality of words composed of the luminance signal component data corresponding to the luminance blocks from the inverse discrete cosine transform means are read and a plurality of words composed of the chroma signal component data corresponding to the chroma blocks from the inverse discrete cosine transform means are read after reading the plurality of words composed of the luminance signal component data in each macroblock for the motion compensation, and wherein a plurality of words composed of the luminance signal component data and the chroma signal component data are read for display.

2. The moving picture decoding device of claim 1 wherein said memory means further comprises:

a plurality of memory devices, each memory device having a first storage area for storing the luminance signal component data and a second storage area for storing the chroma signal component data, wherein the reading of the luminance signal component data from said first storage area of all of said memory devices and the reading of the chroma signal component data from said second storage area of all of said memory devices is performed on a time-division basis during the generation of motion compensated moving picture data, and wherein, during display of decoded moving picture data, the luminance signal component data from said first storage areas of at least one of said memory devices are read at the same time as the chroma signal component data are read from said second storage areas of the remaining ones of said memory devices.

3. The moving picture decoding device of claim 2, wherein, during said motion compensation, when the luminance signal component data are read in a word format consisting of m rows by n columns, where m is an integer not less than 2 and n is an even number, the chroma signal component data are read on a time-division basis in a word format consisting of two m rows by n/2 columns.

4. The moving picture decoding device of claim 3, wherein the chroma signal component data read in a word format consisting of two m rows by n/2 columns are written in different ones of the memory devices than those memory devices in which the luminance signal component data are written in the same row.

5. A method of decoding moving pictures, comprising the steps of:

inverse variable length coding encoded moving picture data to generate inverse variable length coded moving picture data and a vector value, the inverse variable length coded moving picture data including luminance signal component data and chroma signal component data;

generating motion compensated moving picture data in response to motion vector data generated by the inverse variable length coder;

inverse discrete cosine transforming the inverse variable length coded moving picture data to output a plurality of luminance blocks and to output a plurality of chroma blocks after outputting the luminance blocks in each macroblock;

delaying transmission of the motion compensated moving picture data;

adding the inverse discrete cosine transformed inverse variable length coded moving picture data to the delayed motion compensated moving picture data and storing the sum within a memory;

selecting from a plurality of word formats for reading the stored sum, wherein a plurality of words composed of the luminance signal component data corresponding to the luminance blocks are read and a plurality of words composed of the chroma signal component data corresponding to the chroma blocks are read after reading the plurality of words composed of the luminance signal component data in each macroblock for the motion compensation, and wherein a plurality of words composed of the luminance signal component data and the chroma signal component data are read for display.

6. The method of decoding moving pictures of claim 5, further comprising the steps of:

providing a plurality of memory devices, each memory device having a first storage area for storing the luminance signal component data and a second storage area for storing the chroma signal component data;

reading the luminance signal component data from said first storage area of all of said memory devices and reading of the chroma signal component data from said second storage area of all of said memory devices on a time-division basis during the generation of motion compensated moving picture data;

reading the luminance signal component data from said first storage areas of at least one of said memory devices and simultaneously reading the chroma signal component data from said second storage areas of the remaining ones of said memory devices during display of decoded moving picture data.

7. The method of decoding moving pictures of claim 6, further comprising the steps of:

reading the chroma signal component data on a time-division basis in a word format consisting of two m rows by n/2 columns during said motion compensation, when the luminance signal component data are read in a word format consisting of two m rows by n columns, where m is an integer not less than 2 and n is an even number.

8. The method of decoding moving pictures of claim 7, further comprising the steps of:

writing the chroma signal component data in a word format consisting of two m rows by n/2 columns written in different ones of the memory devices than those memory devices in which the luminance signal component data are written in the same row.

* * * * *